July 29, 1969 W. PROCHASKA 3,458,619
PROCESS FOR PRODUCING MOLDED BODIES
Filed April 8, 1966 2 Sheets-Sheet 1
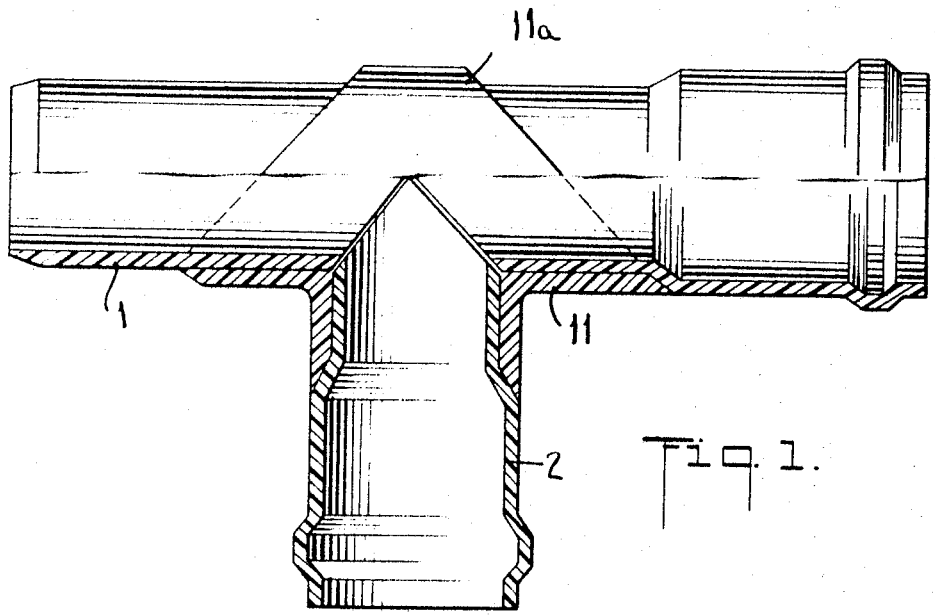
Fig. 1.
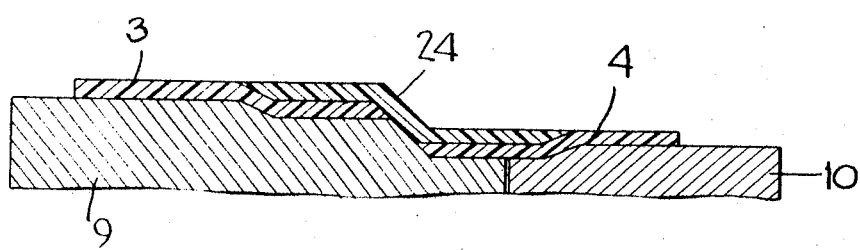
Fig. 2.
Fig. 3.
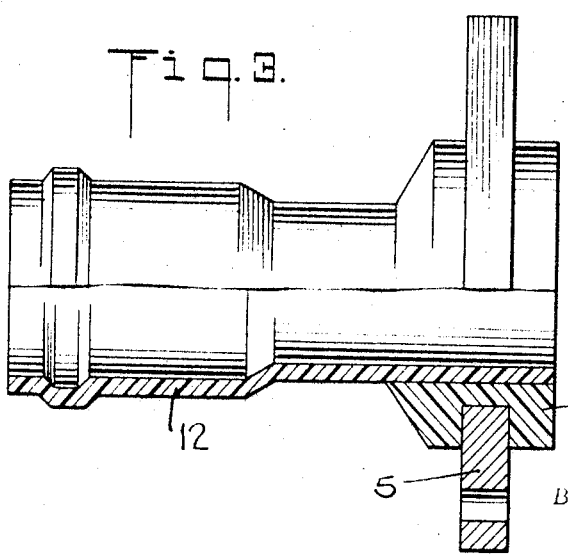
INVENTOR.
WOLFGANG PROCHASKA
BY
AGENT

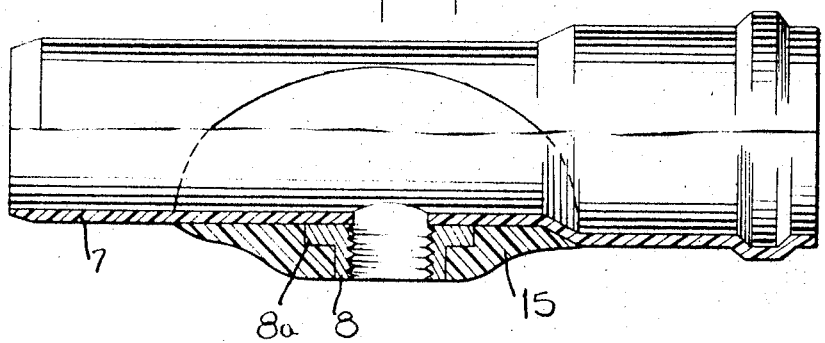
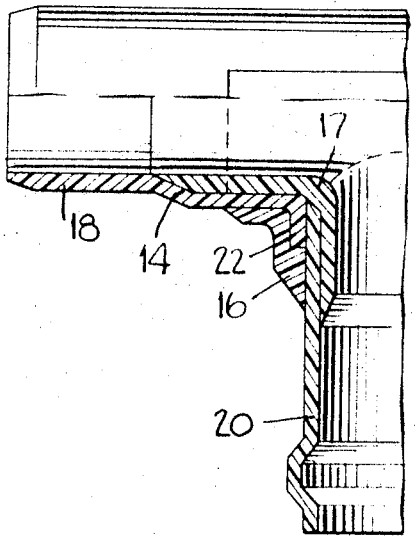
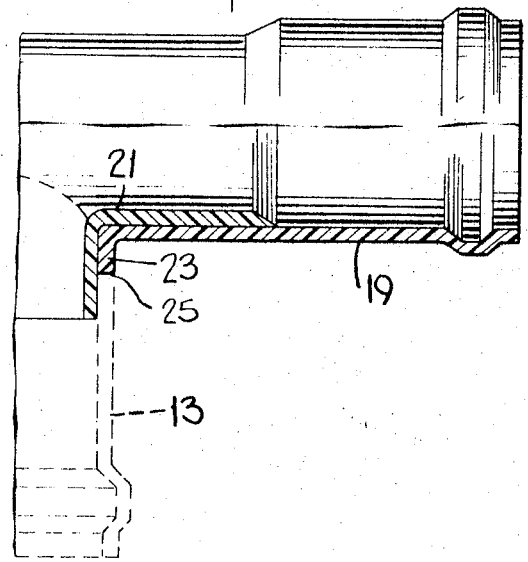

United States Patent Office 3,458,619
Patented July 29, 1969

3,458,619
PROCESS FOR PRODUCING MOLDED BODIES
Wolfgang Prochaska, Munich, Germany, assignor to Kunststoffwerk Gebr. Anger G.m.b.H. & Co., Munich, Germany, a corporation of Germany
Filed Apr. 8, 1966, Ser. No. 541,274
Claims priority, application Germany, Apr. 13, 1965, P 36,522
Int. Cl. B32b 31/06
U.S. Cl. 264—261                                    5 Claims

ABSTRACT OF THE DISCLOSURE

This invention is directed to a process for producing large diameter pipe joints and fittings from at least two mandrel-mounted preformed components, at least one of which is made from a thermoplastic material, that are arranged in a mold in their final relationship after which a molten thermoplastic is injected around the junctions between the components to rigidly unite same into an integral structure, the mandrels are removed, and the finished piece is removed from the mold. The components may be preheated prior to being placed in the mold.

The present invention relates to the manufacture of molded bodies and more particularly to an improved process of producing molded bodies from or by the use of thermoplastics which process is especially useful in the production of molded bodies of considerable nominal width.

Tubes and pipes of thermoplastics have found extensive use in the construction of pipe lines and the like systems. Suitable plastics used for this purpose are, for instance, polyvinylchloride and polyethylene.

Pipe lines and the like systems require not only pipes or tubes and their connecting parts such as sockets or the like, but also molded bodies of varying shape. Such molded bodies, for instance, T-shaped pieces, elbows, crosses, reducers, Y-bends, return bends, or other fittings have been produced heretofore by injection or intrusion molding. However, thereby pressure tubes and pipes of thermoplastic material of only relatively small dimensions could be obtained. The nominal width of such molded parts did not exceed about 100 mm. Pipes or tubes which are not exposed to pressure such as drainage pipes, and the like require only relatively thin-walled molded bodies and thus can also be produced by injection or intrusion molding with a nominal width of up to about 150 mm.

Heretofore, however, it was not possible to produce in a technically satisfactory manner thick-walled molded bodies of thermoplastic material of large nominal width, i.e. of a nominal width exceeding 150 mm. which are equal in their long term strength properties and rigidity to pressure tubes or pipes of thermoplastic material.

Tubes or pipes of thermoplastics are conventionally produced by means of the extrusion molding process whereby it does not matter whether they are used for pressure pipes or for pipes which are not subjected to pressure.

The strength properties of construction elements obtained by extrusion molding are in general superior to those of elements obtained by injection or intrusion molding. As a result thereof molded bodies of thermoplastics as provided for pressure pipe lines must be made of a greater wall thickness. Thus more thermoplastic material is required for their manufacture and the extrusion machines for making such molded bodies must be of greater capacity.

However, it is well known that the expenditures increase considerably and very rapidly when increasing the size and capacity of such machines especially since large molds or dies are required. As a result thereof the production of such molded bodies becomes uneconomical even when taking into consideration the advantages achieved by using such thermoplastic molded bodies in plastic pipe lines. Therefore, metal casts, for instance, of cast iron provided with a plastic coating were used for such fittings of large nominal width.

Such a solution of this problem, however, is highly unsatisfactory especially in view of the fact that any damage to the plastic coating will expose to corrosion the metal cast or fitting inserted into the plastic pipe line.

Furthermore, experience has shown that corrosion especially in the chemical industry may occur quite readily when using another kind of plastic material for coating the shaped metallic part than the plastic material of which the pipe line is composed.

The molded bodies made by injection molding and used heretofore have the further disadvantage that they can be joined to and connected with the pipes or tubes forming the pipe line only by means of adhesive or bonding sleeves or sockets. The goal to be attained is, however, to provide fittings and other molded connecting bodies which can be joined and connected with the pipe line by means of slip-on connections.

The production of such slip-on molded bodies by injection or intrusion molding, if at all possible, requires very considerable expenditure and high manufacturing costs. As a result thereof it was not possible to supply the trade with such molded bodies to an extent sufficient to meet the technical need.

It is one object of the present invention to provide a simple, effective, and inexpensive process of producing molded bodies of thermoplastics and especially such molded bodies of a large nominal width which process overcomes all the disadvantages pointed out hereinbefore.

Another object of the present invention is to provide molded bodies of thermoplastics and especially such molded bodies of large nominal width which are produced by said new and inexpensive process.

Other objects of the present invention and advantageous features thereof will become apparent as the description proceeds.

In principle of the process according to the present invention comprises providing premanufactured and properly machined or trimmed component parts of the molded body to be produced, assembling these component parts by means of inner mandrels to the molded body and introducing the assembled parts with the mandrels into an injection or intrusion machine. Thereupon the abutting or contact points, if desired, and/or the area or zone of said abutting or contact points are covered and surrounded from the inside and/or from the outside with a thermoplastic by injection or intrusion molding. The molten plastic material introduced into the mold by injection or intrusion superficially melts the surface of those parts which are to be joined to such an extent that a firm and intimate connection is achieved at the abutting or contact points, and also within the area of said points, on contact with the molten plastic. The temperature of the molten plastic is to be maintained as high as possible and is dependent upon the melting point and the decomposition point of the plastic. Preferably the temperature is as high as possible above its melding point but still below its decomposition point.

It is advisable to preheat the various parts composing the molded body before they are placed or slid upon the mandrels. In this manner undue and harmful strains and stresses in the molded bodies are avoided and the plastic melt is not chilled too rapidly because rapid chilling might have a detrimental effect upon proper and intimate fusion of the components of the resulting molded body.

It need not be pointed out that the structural parts of the molded body must be cleaned carefully before they are subjected to the process according to the present invention.

According to a preferred embodiment of the present invention the diameter of the mandrels may be varied so that the mandrels can be adjusted to the respective dimenions of the structural component parts of the molded body. The mandrels as used for assembling thereon the component parts of the molded body are, of course, shaped as required for the respective molded body. Cylindrical as well as excentric mandrels can be used. Preferred mandrels are those which are expandable, i.e. the outside diameter of which can be varied. When using such expandable mandrels, deformation or compression of the tube- or pipe-like structural components of the molded body due to the pressure generated on injecting the molten plastic material is avoided.

Preferably the thermoplastic material injected in molten condition into the mold is the same as that of which the structural parts of the molded bodies are composed. It is, however, also possible to use a different thermoplastic material provided it has properties which assure firm and intimate connection and fusion with the components of the molded body.

According to another embodiment of this invention it is also possible to join and connect metallic parts with thermoplastic fittings and the like. For instance, a metal flange or a threaded metal part may be incorporated into the thermoplastic molded body.

The structural component parts used according to this invention may be preshaped, for instance, may be provided with a socket, with reinforcing beads, or the like so that the resulting molded body can be installed into pipe lines immediately after being produced according to the process of this invention.

The process according to this invention is of special advantage because it permits the use of injection or intrusion molding machines of relatively small dimensions even when producing very large molded bodies because the molds for carrying out the process need only be large enough to correspond to the small area occupied by the joint or contact points of the structural component parts of the molded body. Those parts of the assembled components of the molded body which are not to be subjected to the process may extend outwardly from the mold.

The molded bodies obtained according to the present invention possess excellent mechanical strength properties because the resulting joints of the structural parts of the molded bodies are highly resistant to compression, tension, and shear.

The process according to the present invention and molded bodies resulting from carrying out said process are further illustrated by the following description in conjunction with the accompanying drawings in which:

FIG. 1 is a view of a T-shaped fitting, partly in longitudinal cross-section, showing the structural components of said fitting including the abutment covered at its outer surface by injection molded, thermoplastic material;

FIG. 2 is a longitudinal cross-sectional view of part of two tubes of different nominal width, the two mandrels inserted into said tubes, and a sleeve of thermoplastic material joining said two tubes;

FIG. 3 is a view of a flanged plastic tube, partly in longitudinal cross-section, the flange being metallic;

FIG. 4 is a view of a plastic branched pipe, partly in longitudinal cross-section, with a metallic threaded branch-pipe;

FIG. 5a is a view of a plastic branched fitting, partly in longitudinal cross-section, with eccentric increase in cross-sectional area whereby the branch-pipe is joined to the collar-like branch of the fitting by covering it by injection molding with thermoplastic material at its inner and outer surface;

FIG. 5b is a view of the same plastic branched fitting but covered with plastic at its inner surface only.

In FIG. 1 plastic tube 1 made by extrusion molding represents the one structural part of the T-shaped fitting while the other structural part thereof is plastic tube 2. These two parts are firmly joined to form the T-shaped fitting by covering their area of contact with the thermoplastic material 11 as indicated in the cross sectional part of FIG. 1. The covering layer 11a shows in which manner the thermoplastic material is injection molded around tube 1 to firmly attach thereto branch-tube 2. The mandrels are not shown.

FIG. 1 also shows that the two structural component parts of the molded body may be premachined and preshaped at their ends and may be provided with sockets, reinforcing beads, or the like or may have an enlarged diameter. Thus the resulting T-shaped molded body can be installed into pipe lines without requiring further processing and machining.

In FIG. 2 the two pipe ends 3 and 4 do not abut each other as in FIG. 1. Mandrels 9 and 10 are inserted into these pipe ends. Thereafter, the assembled pipe ends and mandrels are placed into an injection mold. The thermoplastic covering and uniting layer 24 is then molded around the two pipe ends 3 and 4 by injection molding to firmly join and connect the two pipes.

In FIG. 3 the end of tube 12 and the metallic flange 5 are assembled and placed into a suitable injection mold. The thermoplastic material 6 is then injection molded around tube end 12 so as to firmly attach the metallic flange to the tube.

FIG. 4 shows plastic tube 7 and threaded metallic outlet tube 8, which is provided at its upper end with collar 8a. The inner diameter of tube 8 is about the same as that of a corresponding hole in tube 7. Collar 8a serves to facilitate anchoring of tube 8 to tube 7. The assembled parts 7 and 8 are placed into a suitable injection mold and the thermoplastic material 15 is injection molded around said tubes 7 and 8 so as to firmly join and unite the two parts to the illustrated molded body.

In FIG. 5a the cross-sectional area of plastic tube 18 is eccentrically enlarged at 14. Collar 22 is provided at the opening in tube 18. Plastic tube 20 is inserted into said collar and the assembled fitting is placed into a suitable mold wherein thermoplastic material is injected to cover the joint between collar 22 and tube 20 on the outside at 16 as well as on the inside at 17. Thereby branch-tube 20 is firmly attached to tube 18 to form a branched fitting, which can immediately be inserted into a pipe line.

FIG. 5b shows plastic tube 19 without enlarged cross-sectional area but with collar 23 in the opening of the tube. Branch-tube 13 abuts the end of collar 23 and may be attached to the collar by an adhesive 25. Firm connection between collar 23 and branch-tube 13 is achieved by injection molding of a thermoplastic layer 21 inside the tubes.

The following example serves to illustrate the present invention without, however, limiting the same thereto.

Example

The T-shaped molded body as illustrated in FIG. 1 is made of the two plastic tube parts 1 and 2 of a nominal width of 200 mm. Tube parts 1 and 2 are composed of rigid polyvinylchloride. The two tube parts 1 and 2 are cut to size in such a manner, that the edges of their ends which are to be joined, abut so as to yield substantially flush joints. Since the two tubes 1 and 2 are of cylindrical shape, the principle of cylindrical penetration must be taken into consideration. If desired, both tubes or only one of them may be provided with sockets, flanges, or the like.

The two tubes 1 and 2 which represent the two structural component parts of the T-shaped molded body are cleaned thoroughly especially at their abutting edges. They are then heated and slid onto their respective mandrels.

The two tubes 1 and 2 are then introduced by said mandrels which are preferably mechanically operated and controlled into the injection mold which is closed. Molten rigid polyvinylchloride is injected into the mold. After remaining in the mold for a few minutes and allowing the mold to cool so as to avoid deformation on removal, the mold is opened, the mandrels are withdrawn, and the finished T-shaped molded body is removed from the mold.

The procedure is similar when joining two tube ends 3 and 4 as shown in FIG. 2.

When attaching metallic flange 5 to plastic tube 12 as illustrated in FIG. 3, a suitable mandrel is inserted into said tube 12 to avoid deformation of the tube end on injecting the molten thermoplastic 6 into the mold.

The procedure of joining metal tube 8 to plastic tube 7, as illustrated in FIG. 4, is about the same as described in the preceding example in connection with FIG. 1 whereby, however, no mandrel is required for the metal tube 8.

In FIGS. 5a and 5b the mandrels, of course, must be provided with suitable recesses so as to permit injection molding of the inner thermoplastic coverings 17 and 21.

What I claim is:

1. In a process of producing molded bodies at least partly being composed of thermoplastic material, the steps which comprise
   (a) providing permanufactured tubular component parts of a molded body, said component parts at least partly being composed of thermoplastic material,
   (b) placing said component parts upon inner mandrels,
   (c) assembling said mandrels with said component parts oriented to the final shape of the molded body so that the mandrels abut each other and areas or zones of contact are defined between said component parts,
   (d) placing only those portions of said mandrel-mounted assembled component parts that contain said areas or zones of contact into a mold with the free ends of said mandrel-mounted assembled component parts which are not subjected to the molding process extending outwardly from said mold,
   (e) introducing molten thermoplastic material into said mold to cover the areas or zones of contact of said component parts with said molten thermoplastic material and to join said parts together,
   (f) cooling, and
   (g) removing the resulting molded body formed of said firmly joined component parts from the mold and the mandrels.

2. The process according to claim 1, wherein the areas or zones of contact of said component parts are covered at their inner surface with the thermoplastic material.

3. The process according to claim 1, wherein the areas or zones of contact of said component parts are covered at their outer surface with the thermoplastic material.

4. The process according to claim 1, wherein the areas or zones of contact of said component parts are covered at their inner as well as outer surfaces with the thermoplastic material.

5. In a process of producing molded bodies at least partly being composed of thermoplastic material, the steps which comprise
   (a) providing a premanufactured plastic tube and a premanufactured metallic flange,
   (b) placing said plastic tube on a mandrel,
   (c) positioning said flange around one end of said mandrel-mounted tube,
   (d) placing only that portion of said mandrel-mounted plastic tube that contains said metallic flange into a mold,
   (e) introducing molten thermoplastic material between said plastic tube and said metallic flange to join same into a unitary flanged tube
   (f) cooling the resulting flanged tube, and
   (g) removing same from the mold and the mandrel.

References Cited

UNITED STATES PATENTS

| | | | |
|---|---|---|---|
| 2,079,393 | 5/1937 | Benge. | |
| 3,214,505 | 10/1965 | Pierkowski et al. | |
| 3,270,114 | 8/1966 | Westlake | 264—263 |
| 3,312,765 | 4/1967 | Scott | 264—248 |
| 2,052,818 | 9/1936 | Freyssinet. | |
| 2,160,108 | 5/1939 | Reid. | |
| 2,312,579 | 3/1943 | O'Brien | 264—262 |
| 2,313,074 | 3/1943 | Jewell | 264—263 |
| 3,159,701 | 12/1964 | Herter | 18—36 X |
| 3,207,833 | 9/1965 | D'Errico | 18—36 X |
| 3,260,777 | 7/1966 | Brandt | 264—262 |

ROBERT F. WHITE, Primary Examiner

K. J. HOVET, Assistant Examiner

U.S. Cl. X.R.

18—36; 264—262, 263; 249—145